Sept. 4, 1951  E. L. STEED  2,566,540
LATCH OPERATED-POSITIVE CLUTCH
Filed July 3, 1946  2 Sheets-Sheet 1
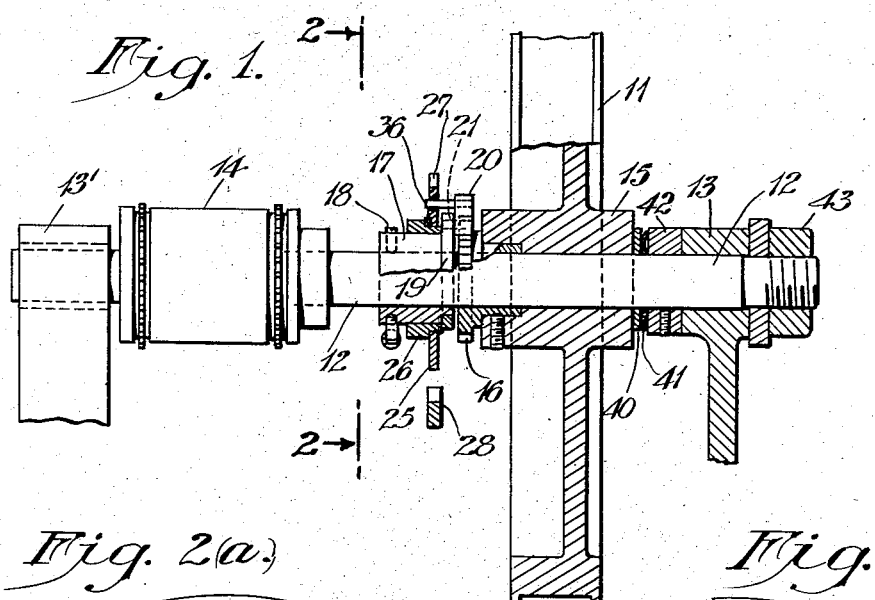
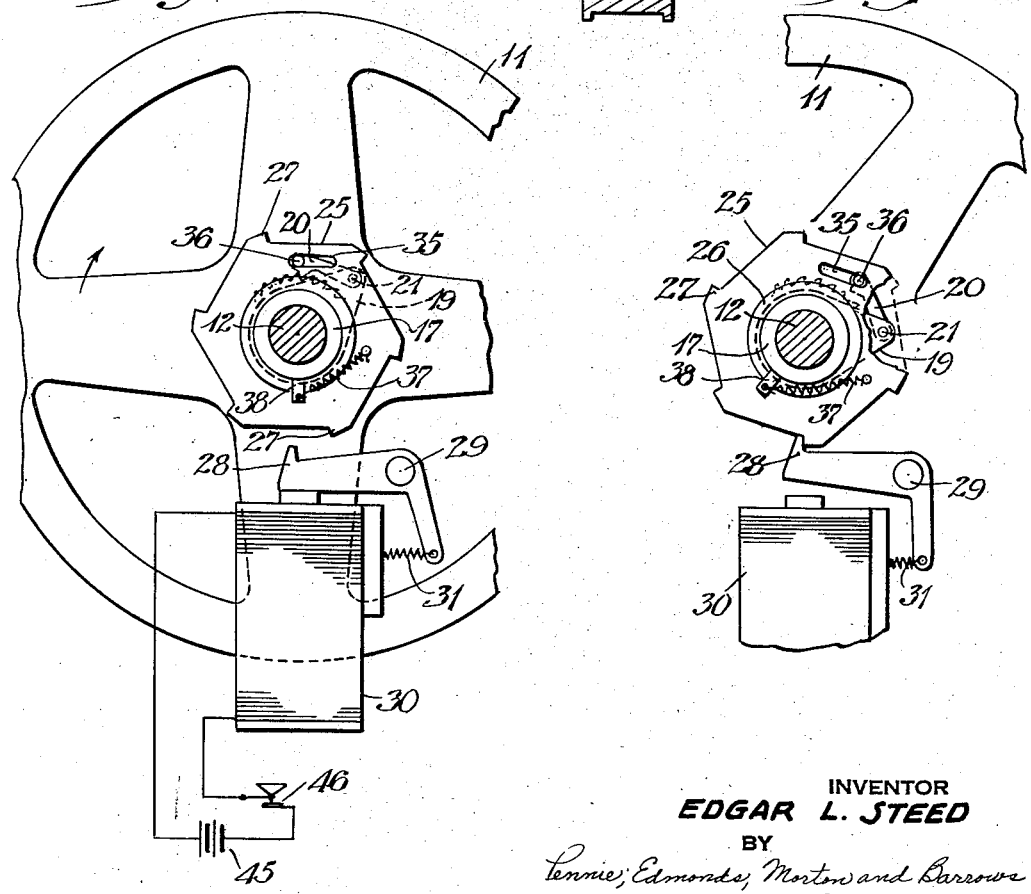
INVENTOR
EDGAR L. STEED
BY
Pennie, Edmonds, Morton and Barrows
ATTORNEYS Sept. 4, 1951  E. L. STEED  2,566,540
LATCH OPERATED-POSITIVE CLUTCH
Filed July 3, 1946  2 Sheets-Sheet 2
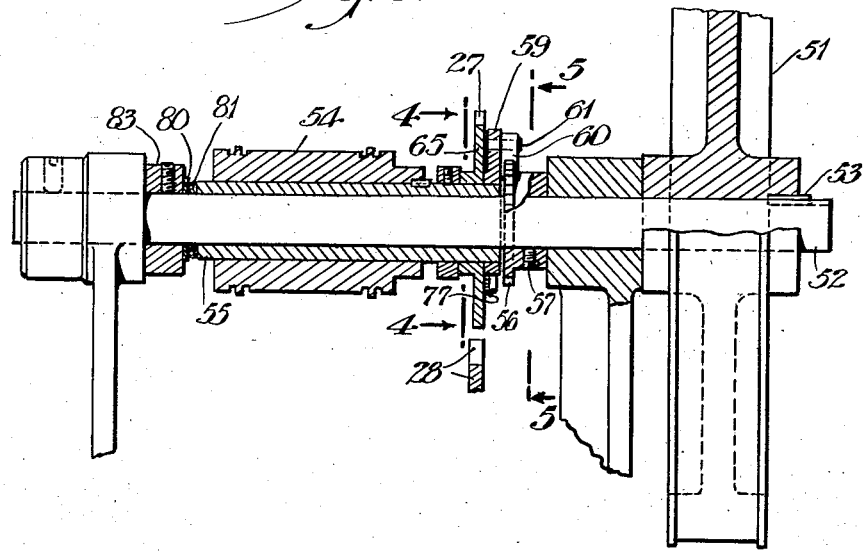
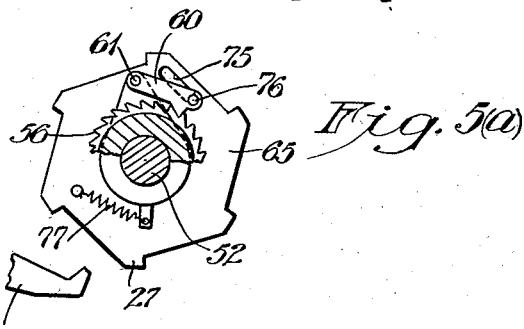
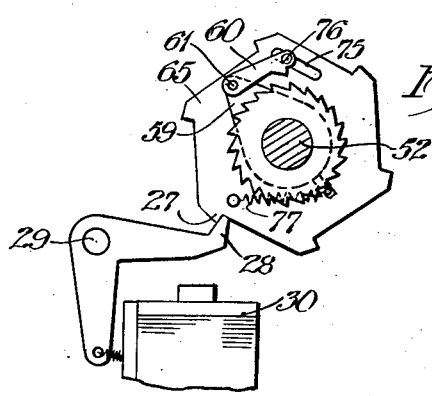
INVENTOR
*EDGAR L. STEED*
BY
ATTORNEYS Patented Sept. 4, 1951

2,566,540

UNITED STATES PATENT OFFICE 2,566,540

LATCH OPERATED POSITIVE CLUTCH

Edgar L. Steed, Poughkeepsie, N. Y., assignor, by mesne assignments, to Recordgraph Corporation, a corporation of Delaware Application July 3, 1946, Serial No. 681,364

4 Claims. (Cl. 192—28)

This invention relates to clutch mechanisms and operating means therefor, suitable for quickly stopping and starting rotation of an output or driven member associated with a continuously rotating input or driving member, and which provided a positive drive between the two members when the clutch is engaged. One application of mechanism of this type is to a film drive in sound recording and reproducing apparatus employing a longitudinally advanced film strip as a record medium, particularly when the film sprocket is operated from a continuously running motor and arrangements are desirable for precisely controlling the advancement of the film, as for dictating or sound track editing purposes. Obviously, however, the invention is not limited to such application but may be used as a component of or in association with a wide variety of other mechanisms.

It is an object of the invention to provide a rotatable clutch mechanism providing, in its engaged condition, a positive drive from an input to an output member and one which may be readily controlled as to its engaged or disengaged condition by non-rotating means in precise relation to the operation of such means.

Another object is to provide a quick-engaging and quick-releasing positive drive clutch having rotatable cam means actuated to cause the engagement and disengagement of the clutch upon a slight displacement of relatively stationary means.

A further object is to provide a clutch mechanism having the above characteristics which is compact, reliable in operation and economical to manufacture.

In its general aspects the invention comprises a clutch mechanism having coaxially rotatable driving and driven members which may be positively coupled by a pawl and ratchet carried by and rotating with the two members, respectively. Engagement and disengagement of the pawl and ratchet is effected by the relative displacement of a cam and follower, both elements being carried by the driven member and one of the elements being angularly displaceable relative thereto. By arresting rotation of this latter element through the operation of non-rotating means, when the clutch is engaged, a relative displacement of the two cam elements may be produced which quickly lifts the pawl out of engagement with its cooperating ratchet, against a spring bias, and breaks the positive driving connection between the driving and the driven members. When the cam element whose motion has been arrested is released, the spring bias quickly brings about the reengagement of the pawl and ratchet and thereby re-establishing a positive connection between the driving and driven members.

The invention will be better understood from the following detailed description, taken in connection with the appended drawings, in which:

Fig. 1 is an elevational view partly in section of a film drive comprising a clutch mechanism, in accordance with the invention;

Fig. 2a is a section along the line 2—2 of Fig. 1 showing the cam mechanism of the clutch in one of its two operating positions;

Fig. 2b is a similar section showing the clutch cam mechanism in the other of its operating positions;

Fig. 3 is an elevation partly in section of a modification of the arrangement of Fig. 1;

Fig. 4 is a section along the line 4—4 of Fig. 3;

Fig. 5a is a section along the line 5—5 of Fig. 3 showing the cam mechanism of the clutch in one of its two operating positions;

Fig. 5b is a similar section showing the clutch cam mechanism in the other of its operating positions.

In the figures numeral 11 is applied to a pulley adapted to be driven from a source of power, such as a motor, not shown. Pulley 11 is mounted for rotation about a shaft 12, journaled in bearings 13, 13' and fixedly mounting an output or driven device, illustrated as film sprocket 14. Pulley 11 has a bored hub or sleeve portion 15 on which ratchet 16 is fixed in coaxial relation to the bore thereof. A collar 17 attached to shaft 12, as by set screw 18, mounts a member having a radially projecting portion 19 on which a pawl 20 is pivoted at pivot point 21. Disk 25, having a hub portion 26, is rotatable about collar 17 and has teeth 27 in the periphery thereof to constitute a second ratchet which may be engaged by a second pawl 28 pivoted at 29 to stationary means. Pawl 28 may be wholly or in part of magnetic material to act as the armature of an electromagnet 30, energization of which holds the pawl out of engagement with teeth 27 of ratchet 25 against the restoring force of a spring 31.

Pawl 20 is operated to and from engagement with ratchet 16 by means of a cam-and-follower mechanism constituted by a slot 35 in the web of ratchet disk 25, progressively varying in distance from the center of the disk along its length, and a pin 36 fixed in the pawl at a point remote from the pivot point thereof. In the clutch assembly pin 36 extends within slot 35 to be moved substantially radially as the angular relation of slot and pin changes. Pin 36 also serves to limit the angular excursion of ratchet 25 to that permitted by the length of slot 35.

Ratchet 25, with its slot 35, is rotatably biased toward a position causing pin 36 to effect the engagement of pawl 20 and ratchet 16 by a spring 37 extending between ratchet 25 and a stud 38, seated in and projecting from collar 17. This spring exerts a torque between ratchet 25 and collar 17, fast to shaft 12, about the common rotative axis thereof. A plain washer 40 and a dished spring washer 41, both of annular form, carried by shaft 12 between the right-hand face of hub 15 of pulley 11 and a collar 42 fixed to the shaft, provide a frictional drag between the pulley and shaft, that is between driving and driven members of the clutch mechanism. By this means a slight tendency is created for the driven member to be rotated with the driving member even when pawl 20 and ratchet 16 are disengaged, this tendency being limited in effect and for a purpose that will be described. An adjustment of the frictional drag may be had by varying the degree of compression of dished washer 41 by means of nut 43, in threaded engagement with the end of shaft 12, which may be locked in an adjusted position by suitable means, not shown.

The operation of the described clutch mechanism and film drive is as follows: Pulley 11 is assumed to be rotated continuously in one direction, as shown by the arrow, from the source of power. With magnet 30 energized from a suitable electrical source, such as battery 45, by the closing of switch or key 46, pawl 28 is held in its retracted position clear of teeth 27 of ratchet 25. Under these conditions the force of spring 37 rotates ratchet 25 about collar 17 to a position which causes pin 36 to operate pawl 20 into engagement with ratchet 16. Shaft 12 and sprocket 14 are thereby positively driven from pulley 11. See Fig. 2a.

To stop rotation of the driven shaft and sprocket, magnet 30 is deenergized, by the opening of key 46, causing pawl 28 to be operated by spring 31 into engagement with one of the teeth 27 of ratchet 25 to immobilize the ratchet. Shaft 12 continues to rotate through a small arc carrying pin 36 with it. Displacement of pin 36 along the now stationary slot 35 moves the pin outwardly away from the center of ratchet 25 and thereby lifts pawl 20 out of engagement with ratchet 16 and breaks the driving connection between pulley 11 and shaft 12. This occurs in precise relation to the operation of pawl 28 due to the predetermined distance pin 36 travels along slot 35, which can be caused to correspond to a very small arc of rotation of shaft 12. See Fig. 2b.

The frictional drag between pulley 11 and shaft 12 due to washers 40 and 41 is preferably more than equal to the torque exerted between ratchet 25 and collar 17 by spring 37 plus the torque of the driven load, so that pawl 20 may be held clear of ratchet 16 while ratchet 25 is stationary.

In the modification of the invention shown in Fig. 3 and the following figures, the mounting of the driving and driven members of the mechanism is interchanged. As therein shown pulley 51 is fixed on shaft 52 by means of a key 53, instead of the pulley being rotatable about the shaft as in Fig. 1, while film sprocket 54, instead, is mounted on a sleeve 55 which is rotatable about shaft 52. The shaft thereby becomes a driving member of the clutch mechanism and the sleeve a driven member. Ratchet 56 has a hub fixed to shaft 52 by set screw 57 while radially projecting member 59, fixed on sleeve 55, pivotally mounts pawl 60 at pivot point 61. A second ratchet 65 coresponding to ratchet 25, has a limited rotation about sleeve 55 and is engageable by pawl 28 pivoted at 29 to stationary means and serving, as before, as the armature of electromagnet 30.

The rotatable cam means for operating pawl 60 to and from engagement with ratchet 56 is similar to that described in connection with the modification of Fig. 1 and comprises a slot 75 in ratchet 65, corresponding to slot 35 in ratchet 25, and a pin 76 fixed in pawl 60 at a point remote from the pivot point thereof. Spring 77, corresponding to spring 37, rotatably biases ratchet 65 about sleeve 55 and plain and spring washers 80 and 81, respectively, provide a friction drag between sleeve 55 and a collar 83 fast on shaft 52.

The operation of the modification of the invention just described will be readily understood from the earlier description of the operation of the modification of Fig. 1.

Figs. 4 and 5a show pawl 60 engaged with ratchet 56 while Fig. 5b shows the pawl disengaged therefrom.

In both forms of the invention cam-and-follower means having the two elements thereof rotatable with the clutch are relatively actuated in one direction by operation of a member supported on stationary means and in the other direction by spring means, to effect disengagement and engagement, respectively, of the driving and driven members. Rapid engagement and disengagement of these members is brought about by the small angle through which the cam pin travels, relative to the cam slot, to operate the driving pawl. Electromagnetically operated means have been illustrated and described herein for the actuation of the cam means but it will be apparent that a mechanically controlled member may be substituted for magnetic pawl 28.

The embodiments of the invention illustrated and described herein are to be taken to be by way of illustration, only, and not as limiting the scope of the invention, which is defined in the appended claims.

I claim:

1. In a quick acting clutch mechanism a rotatable driving member, a driven member rotatable coaxially therewith, a first ratchet fixedly mounted on said driving member, a first pawl mounted on said driven member engageable with said first ratchet to positively transmit rotary motion from said driving to said driven member, a second ratchet rotatable with and limitedly displaceable relative to the driven member about the rotational axis thereof, cam and follower means having one of its elements movable with said first pawl and its other element movable with said second ratchet, said cam and follower means being arranged to move said first pawl into engagement with said first ratchet in response to displacement of said second ratchet with respect to said driven member in one direction and to move said first pawl out of engagement with said first ratchet in response to displacement of said second ratchet with respect to said driven member in the opposite direction, resilient means exerting a torque between said second ratchet and said driven member about the rotational axis thereof to bias said second ratchet in said one direction with respect to said driven member, frictional means producing a frictional drag between said members greater than said torque and in the opposite direction thereto when the driving member is rotating in the direction opposite the direction of said torque, said frictional means including resilient means exerting a force against both of said driving and driven members to produce said frictional drag, a second pawl fixedly supported and movable into engagement with said second ratchet to hold it against rotary movement, and means for moving said second pawl into and out of engagement with said second ratchet, whereby when the driving and driven members are rotating in the direction opposite said torque, movement of said second pawl into engagement with said second ratchet causes a displacement of the second ratchet with respect to the driven member in said opposite direction to cause said cam and follower means to disengage said first pawl and said first ratchet to stop transmission of rotary motion from the driving to the driven member and said frictional drag holds said second ratchet and said driven member against relative movement to prevent re-engagement of said first pawl with said first ratchet as long as said second pawl is engaged with said second ratchet.

2. The apparatus defined in claim 1 having means for adjusting said frictional means to vary said frictional drag.

3. In a quick acting clutch mechanism a rotatable shaft, a sleeve coaxially rotatable about said shaft, said sleeve being a driving member and said shaft a driven member, a first ratchet fixedly mounted on said sleeve, a first pawl pivotally mounted on said shaft and engageable with said first ratchet to positively transmit rotary motion from said sleeve to said shaft, a second ratchet rotatable with and limitedly displaceable relative to said shaft about its rotational axis, cam and follower means having one of its elements movable with said first pawl and the other element movable with said second ratchet, said cam and follower means being arranged to move said first pawl into engagement with said first ratchet in response to displacement of the second ratchet with respect to said shaft in one direction and to move said first pawl out of engagement with said first ratchet in response to displacement of the second ratchet with respect to the shaft in the opposite direction, resilient means exerting a torque between said second ratchet and the shaft to bias said second ratchet with respect to said shaft in said one direction, frictional means producing a frictional drag between said members greater than said torque and in the opposite direction thereto when the driving member is rotating in the direction opposite the direction of said torque, said frictional means including resilient means exerting a force against both of said driving and driven members to produce said frictional drag, a second pawl fixedly supported and movable into engagement with said second ratchet to hold it against rotary movement, and means for moving said second pawl into and out of engagement with said second ratchet, whereby when the driving and driven members are rotating in the direction opposite said torque movement of said second pawl into engagement with said second ratchet causes a displacement of the second ratchet with respect to the shaft in said opposite direction to cause said cam and follower means to disengage said first pawl and said first ratchet to stop transmission of rotary motion from said sleeve to said shaft and said frictional drag holds said second ratchet and said driven member against relative movement to prevent re-engagement of said first pawl with said first ratchet as long as said second pawl is engaged with said second ratchet.

4. In a quick acting clutch mechanism a rotatable shaft, a sleeve coaxially rotatable about said shaft, said shaft being a driving member and said sleeve a driven member, a first ratchet fixedly mounted on said shaft, a first pawl pivotally mounted on said sleeve and engageable with said first ratchet to positively transmit rotary motion from said shaft to said sleeve, a second ratchet rotatable with and limitedly displaceable relative to said sleeve about its rotational axis, cam and follower means having one of its elements movable with said first pawl and the other element movable with said second ratchet, said cam and follower means being arranged to move said first pawl into engagement with said first ratchet in response to displacement of the second ratchet with respect to said sleeve in one direction and to move said first pawl out of engagement with said first ratchet in response to displacement of the second ratchet with respect to the sleeve in the opposite direction, resilient means exerting a torque between said second ratchet and the sleeve to bias said second ratchet with respect to the sleeve in said one direction, frictional means producing a frictional drag between said members greater than said torque and in the opposite direction thereto when the driving member is rotating in the direction opposite the direction of said torque, said frictional means including resilient means exerting a force against both of said driving and driven members to produce said frictional drag, a second pawl fixedly supported and movable into engagement with said second ratchet to hold it against rotary movement, and means for moving said second pawl into and out of engagement with said second ratchet, whereby when the shaft and the sleeve are rotating in the direction opposite said torque, movement of said second pawl into engagement with said second ratchet causes a displacement of the second ratchet with respect to the sleeve in said opposite direction to cause said cam and follower means to disengage said first pawl and said first ratchet to stop transmission of rotary motion from said shaft to said sleeve and said frictional drag holds said second ratchet and said sleeve against relative movement to prevent re-engagement of said first pawl with said first ratchet as long as said second pawl is engaged with said second ratchet.

EDGAR L. STEED.

REFERENCES CITED

The following references are of record in the file of this patent:

UNITED STATES PATENTS

| Number | Name | Date |
|---|---|---|
| 577,247 | Geb | Feb. 16, 1897 |
| 1,493,937 | Hartley | May 13, 1924 |
| 1,919,651 | Helsel | July 25, 1933 |